United States Patent [19]

Moriwaki et al.

[11] Patent Number: 5,837,317
[45] Date of Patent: Nov. 17, 1998

[54] METHOD OF PRODUCING HYDROGEN STORAGE ALLOY FOR BATTERY

[75] Inventors: Yoshio Moriwaki, Hirakata; Yoichi Izumi, Habikino; Yasuharu Yamamura; Hideo Kaiya, both of Chigasaki, all of Japan

[73] Assignee: Matsushita Electric Industrial Co., Ltd.

[21] Appl. No.: 813,889

[22] Filed: Mar. 7, 1997

[30] Foreign Application Priority Data

Mar. 8, 1996 [JP] Japan .................. 8-051264

[51] Int. Cl.$^6$ .............. B05D 7/00; B05D 3/02; B05D 3/12; B05D 5/12
[52] U.S. Cl. .............. 427/217; 427/123; 427/126.6; 427/212; 427/216; 427/318; 427/319; 427/383.1; 427/383.7; 148/513
[58] Field of Search .................. 427/126.6, 123, 427/212, 216, 217, 318, 319, 383.1, 383.7; 75/392, 711; 148/513; 420/900, 441, 455; 423/21.1, 138; 429/59, 101

[56] References Cited

U.S. PATENT DOCUMENTS

| 4,222,770 | 9/1980 | Osumi et al. ............... 75/122 |
| 4,837,119 | 6/1989 | Ikoma et al. ............. 429/206 |
| 5,376,474 | 12/1994 | Tadokoro et al. .......... 429/59 |
| 5,395,403 | 3/1995 | Kimoto et al. .......... 29/623.5 |
| 5,575,831 | 11/1996 | Yamamura et al. .......... 75/614 |
| 5,616,435 | 4/1997 | Matsuura et al. ........ 429/218 |
| 5,629,111 | 5/1997 | Yamawaki et al. ....... 429/223 |
| 5,672,447 | 9/1997 | Yamawaki et al. ....... 429/223 |

FOREIGN PATENT DOCUMENTS

| 0 557 656 A | 9/1993 | European Pat. Off. . |
| 61-138459 | 6/1986 | Japan . |
| 62-139258 | 6/1987 | Japan . |
| 3-263760 | 11/1991 | Japan . |
| 0 588 310 A | 3/1994 | Japan . |
| 6-150921 | 5/1994 | Japan . |

*Primary Examiner*—Shrive Beck
*Assistant Examiner*—Michael Barr

[57] ABSTRACT

The present invention provides a method of producing a hydrogen storage alloy low in cobalt content which can restrains a decrease in cycle life characteristic and preservation characteristic of an alkaline storage battery when the alloy is used as a negative electrode. The method includes the following steps. An Mm-Ni system hydrogen storage alloy which has a crystal structure of $CaCu_5$ and contains 15 atom % or less of cobalt is powdered to have an average particle diameter of 10–100 $\mu$m. Then, the powdered alloy is immersed in a treatment solution at 80°–130° C., the treatment solution comprising an alkaline aqueous solution containing 10 g/l or more of lithium hydroxide and having a specific gravity of 1.1 or higher, and cobalt ions which is contained in the alkaline aqueous solution, thereby forming a layer containing nickel and cobalt in higher concentration than in the bulk of the powdered alloy onto the alloy surface.

5 Claims, No Drawings

METHOD OF PRODUCING HYDROGEN STORAGE ALLOY FOR BATTERY

BACKGROUND OF THE INVENTION

The present invention relates to a method of producing a hydrogen storage alloy which can electrochemically absorb and desorb hydrogen in a reversible manner for use in the negative electrode of an alkaline storage battery such as a nickel-metal hydride storage battery.

Alkaline storage batteries are highly reliable and can be miniaturized. For these advantages, small-sized ones are used mainly in portable appliances while medium- and large-sized ones are used as portable or installed power sources.

Among alkaline storage batteries, nickel-cadmium storage batteries which use nickel positive electrode and cadmium negative electrode have been the most popular.

Recently, however, nickel-cadmium storage batteries have been replaced by nickel-metal hydride storage batteries which use a hydrogen storage alloy for the negative electrode because these batteries have a higher energy density. An $AB_5$ type alloy having a crystal structure of $CaCu_5$ like $MmNi_{3.55}Co_{0.75}Mn_{0.4}Al_{0.3}$ (Mm: misch metal), where a base is $LaNi_5$ or $MmNi_5$ and its nickel atoms are replaced in part by another metal atoms such as manganese, aluminum or cobalt, are generally used as a hydrogen storage alloy for use in the negative electrode of the alkaline storage battery.

The $AB_5$ type hydrogen storage alloys are usually prepared by high-frequency melting-casting method or arc melting method. After pulverization into a powder, the alloys are either coated over or filled into a conductive substrate such as a nickel-plated iron punched metal sheet or a foamed nickel sheet, thereby formed into a non-sintered (paste type) hydrogen storage alloy electrode. The electrode thus produced is used to assemble a nickel-metal hydride storage battery, together with a well-known nickel oxide positive electrode, a separator, an alkaline electrolyte and the like.

Most nickel-metal hydride storage batteries with the $AB_5$ type alloy are used as cylindrical or rectangular sealed storage batteries. They have been widely used rapidly because of the advantages of a higher energy density than nickel-cadmium storage batteries and a low risk of environmental pollution because of a freedom from cadmium.

There have been further demands for these nickel-metal hydride storage batteries to increase the energy density, that is, the battery capacity, and to improve the rapid charge characteristic, high-rate discharge characteristic, cycle life characteristic and preservation characteristics such as self-discharge and high-temperature preservation. Cost reduction is also desired to make them put in wider use as commodity batteries.

In order to meet these demands and desire, an improvement of hydrogen storage alloys for use in nickel-metal hydride storage batteries has been studied actively.

For example, for the purpose of reducing the cost of hydrogen storage alloys, it has been tried to replace a metal element of the alloys by a less expensive material.

In the $AB_5$ type hydrogen storage alloys, it is desired to reduce the amount of or to eliminate the use of cobalt which is comparatively expensive among the components of the alloy. For this reason, various measures have been taken such as replacement of cobalt by another element and change in the ratio between A site element and B site element.

However, it has turned out that to eliminate the use of cobalt in a hydrogen storage alloy is difficult when the alloy is used for a battery electrode because cobalt plays the following important roles in the alloy. When used in an alkaline storage battery electrode, cobalt restrains alloy corrosion which is caused by an alkaline electrolyte, thereby preventing the deterioration of the battery performance. Furthermore, cobalt restrains oxidation of the alloy caused by the oxygen gas evolved inside the battery during overcharging and the heat generated during charging.

These effects are considered to result mainly from the mechanism that cobalt prevents the alloy from being powdered due to hydrogenation and dehydrogenation during a charge-discharge operation and that cobalt makes the alloy bulk chemically more stable. These effects of restraining the corrosion and oxidation of the alloy are approximately in proportion to cobalt content. For example, when an alloy contains 15 atom % or more of cobalt, the cycle life and preservation characteristics of the battery are not so affected. However, when the cobalt content is less than this value, especially when 6 atom % or less, these characteristics are deteriorated. For this reason, it is generally considered that a reduction in cobalt content and the security of cycle life and long term preservation characteristics are incompatible.

On the other hand, there have been various studies on the composition structures, producing methods, and surface treatments of the alloys. For example, as for the composition structures, addition of a new element has been tried to form a fine segregated phase inside the alloy. Concerning the producing methods, a gas atomizing method which provides a higher cooling rate than the conventional high-frequency melting-casting method is under study.

There are numerous suggestions for the surface treatments of the alloys. Typical ones are to etch alloy surfaces with an alkaline solution, to plate alloy surfaces with a metal such as nickel or copper, and to coat alloy surfaces with a fluoride.

However, neither of these methods is sufficient to improve the cycle life and preservation characteristics of the alkaline storage battery, and these characteristics deteriorate especially when the alloy has a low cobalt content of about 0 to 6 atom %.

Although nickel-metal hydride storage batteries have been desired to have further improved rapid charge and high-rate discharge characteristics, no satisfactory method has been found to improve these characteristics, as well as the cycle life and preservation characteristics at the same time.

Another demand for hydrogen storage alloys is to improve their security. Since they are usually pulverized into powder having an average particle diameter of 10 to 100 $\mu m$ and then formed into electrodes, they are handled in the form of powder or electrodes. However, these alloys tend to ignite through a mechanical impact, and the smaller the alloy particle, the more the danger. Therefore, it is necessary to reduce the ease of ignition of hydrogen storage alloys in order to improve the security.

As explained hereinbefore, in the production of the $AB_5$ type hydrogen storage alloys for use in the alkaline storage batteries, the highest priority has been placed on the suppression of the deterioration in the characteristics that are caused by the reduction of cobalt content, particularly in the cycle life and preservation characteristics. The subsequent problems to be solved are to improve the rapid charge and high-rate discharge characteristics of the alkaline storage batteries using such alloys and to reduce the danger of ignition of electrodes using the alloys.

BRIEF SUMMARY OF THE INVENTION

The present invention provides a method of producing an $AB_5$ type hydrogen storage alloy where the base is $MmNi_5$ and at least nickel atoms have been replaced in part by cobalt atoms, the alloy to be used for fabrication of an alkaline storage battery that has excellent in the cycle life characteristic, preservation characteristic, rapid charge characteristic, and high-rate discharge characteristic although the alloy is low in cobalt content. The present invention further provides a method of producing a hydrogen storage alloy having no or little danger of ignition which has been a problem in the production of the alloy and a battery electrode using the alloy.

Production of a hydrogen storage alloy in accordance with the present invention is carried out as follows: An Mm-Ni system hydrogen storage alloy which has a crystal structure of $CaCu_5$ and a cobalt content of 15 atom % or less is powdered to have an average particle diameter of 10 to 100 $\mu$m. The alloy powder is added to and mixed with a treatment solution at 80°–130° C. The treatment solution comprising an alkaline aqueous solution containing 10 g/l or more of dissolved lithium hydroxide and having a specific gravity of 1.1 or larger, and cobalt ions which is contained in the alkaline aqueous solution. As a result, a layer which contains nickel and cobalt at a higher concentration than the bulk of the particle are formed on the surface of each alloy particle.

It is estimated that the above-mentioned method in accordance with the present invention produced a novel method of surface treatment by the mechanism that heating the alkaline aqueous solution dissolving lithium hydroxide at high temperature accelerates etching of the alloy surface, which in turn leads to successful deposition of the nickel which is difficult to dissolve in the solution and the ionized cobalt in the aqueous solution over the alloy surface.

The use of such a surface-treated hydrogen storage alloy for an alkaline storage battery electrode improves the poor corrosion resistance and oxidation resistance which have been problems for an alloy with a low content of cobalt. Furthermore, the coating layer improves the rapid charge and high-rate discharge characteristics, which are considered to result from the porosity and excellent electric conductivity of the layer. A further effect of the surface-treated hydrogen storage alloy is to reduce the risk of ignition.

It is preferable that the hydrogen storage alloy is powdered at a cooling rate of $10^3$ K/sec or higher by either the gas atomizing method, roll quenching method, or centrifugal atomizing method. Although the surface treatment is effective for the alloy powders of low cobalt content in general, the alloy obtained by these ultra-rapid quenching methods at a high cooling rate of $10^3$ K/sec or higher are more liable to be affected by the surface treatment than those prepared by the normal high frequency melting-casting method or arc melting method. The reason for this difference is believed that the alloys prepared by these ultra-rapid quenching methods have smoother surfaces and smaller crystal sizes than those prepared at a normal cooling rate. As explained above, the surface treatment is effective for an electrode employing the alloy powder, similar to the alloy powder.

The hydrogen storage alloys used in the present invention are of Mm-Ni system having a crystal structure of $CaCu_5$ and contain cobalt of 15 atom % or less. It is preferable for the alloys to contain copper, iron, chromium, molybdenum, vanadium, titanium or zirconium. The effects of the present invention are more efficient to the alloys of low cobalt content such as 0.1 to 6 atom % which have poor corrosion resistance against an electrolyte.

The alkaline aqueous solution which can be used for the surface treatment contains potassium hydroxide, sodium hydroxide, or the like as the main component, and must contain 10 g/l or more of lithium hydroxide. If the concentration of lithium hydroxide is low, the erosion of the solution into the alloy does not proceed well and long time is required for the treatment. It is also preferable for the solution to have a specific gravity of 1.1 or higher and be heated at 80° to 130° C. When the concentration or the temperature is lower, the effects of the surface treatment become insufficient. It is effective to have the highest possible concentration and temperature under these requirements, in order to complete the process in a shorter time. Concerning the cobalt species which is dissolved in the alkaline aqueous solution, any cobalt in a form of metal, oxide, hydroxide or chloride may be used if only it can be ionized in the alkaline aqueous solution. The preferable cobalt content is 0.5 to 5 parts by weight to 100 parts by weight of the alloy.

Other known techniques of the surface treatment for hydrogen storage alloys for use in a battery electrode include to form a cobalt layer over alloy powder surfaces as is disclosed in Japanese Laid-open Patent Publication Hei 6-150921, and to treat the alloy powder surfaces in a high-temperature alkaline aqueous solution. The present invention is different from these techniques in that the alloy powder surface is covered with a nickel- and cobalt-rich layer.

While the novel features of the invention are set forth particularly in the appended claims, the invention, both as to organization and content, will be better understood and appreciated, along with other objects and features thereof, from the following detailed description.

DETAILED DESCRIPTION OF THE INVENTION

Hereinafter, the embodiments of the present invention will be described in detail more specifically.

EMBODIMENT 1

Six Mm-Ni system hydrogen storage alloys having a crystal structure of $CaCu_5$ were prepared by the normal high-frequency melting-casting method by varying cobalt content as shown in Table 1 below. These alloys No. 1–6 were then heat-treated for 6 hours at 1,000° C. in a vacuum, and mechanically pulverized to have an average particle diameter of 30 $\mu$m.

TABLE 1

| No. | Composition | Co content (atom %) |
|---|---|---|
| 1 | $MmNi_{3.55}Co_{0.75}MN_{0.4}Al_{0.3}$ | 12.5 |
| 2 | $MmNi_{3.75}Co_{0.55}MN_{0.4}Al_{0.3}$ | 9.2 |
| 3 | $MmNi_{3.75}Co_{0.35}MN_{0.5}Al_{0.4}$ | 5.8 |
| 4 | $MmNi_{3.95}Co_{0.15}MN_{0.5}Al_{0.4}$ | 2.5 |
| 5 | $MmNi_{4.0}Co_{0.05}MN_{0.55}Al_{0.4}$ | 0.8 |
| 6 | $MmNi_{4.05}Mn_{0.55}Al_{0.4}$ | 0 |

One litter of an alkaline aqueous solution of potassium hydroxide containing 40 g/l of dissolved lithium hydroxide and having a specific gravity of 1.30 was poured in a fluorocarbon resin container and heated up to 120° C. When the temperature of the alkaline aqueous solution reached 120° C., 3 g of cobalt hydroxide was added to and mixed with the alkaline aqueous solution, and then 300 g of a pulverized hydrogen storage alloy was added thereto. While keeping at 120° C., the alkaline aqueous solution was stirred every 10 minutes for about 30 seconds. After continuing the treatment for 5 hours, the powdered alloy was well rinsed with water until the pH of the water became 8 or lower, and then dried at 50° C. This process was applied to the powdered alloys No. 1–6 individually. As a result, the color of all the powdered alloys were changed from metallic into black.

The compositions of these treated hydrogen storage alloy powders were analyzed. Although it was impossible to determine the exact entire compositions of the alloys from the surfaces to the center because these samples were all in a powdery state, it was found that the blackened surface of the alloy powder is covered with a nickel- and cobalt-rich layer (about 40–60 atom % of nickel metal and about 10–30 atom % of cobalt metal), and that the concentrations of both nickel and cobalt gradually decreased in the direction of depth and finally reached the level in the original alloy compositions. It was also recognized from a comparison of the compositions of the alloys No. 1–6 that an alloy having a lower cobalt content formed the nickel- and cobalt-rich layer more effectively.

The alloys No. 1–6 were used to prepare 6 surface-treated alloy powders and 6 untreated alloy powders. By using the total of 12 alloy powders thus prepared, 12 sealed-type nickel-metal hydride storage batteries were manufactured in the following manner, and the characteristics of these batteries were examined.

Each of the 12 alloy powders was mixed with water to form a paste. The paste was applied to a foamed nickel sheet (nickel sponge metal) with a porosity of 95% and a thickness of 1.0 mm. The foamed nickel sheet with the paste was dried, pressed to a thickness of 0.35 mm, and cut into a predetermined size to formed a negative electrode.

A well-known foamed nickel electrode was used as the positive electrode, and a hydrophilic polypropylene non-woven fabric was used as the separator.

The negative and positive electrodes thus produced were stacked with the separator inbetween and coiled up to put the whole in an AA-size battery case. Then, an electrolyte was prepared by dissolving 30 g/l of lithium hydroxide in a potassium hydroxide aqueous solution having a specific gravity of 1.30. Thus prepared electrolyte was poured in the battery case. Then, a lid with a safety valve was attached to the opening of the battery case. The capacity of this battery is restricted by the positive electrode and its standard capacity is 1,200 mAh.

These 12 nickel-metal hydride storage batteries thus manufactured were subjected to 5 cycles of charge-discharge operations as an initial charge-discharge operation where charging is performed for 6 hours at room temperature with a current of 240 mA and discharging at room temperature with a current of 240 mA until the battery voltage drops to 1.0 V.

After the initial charge-discharge operation, the following main battery characteristics were examined in these 12 alkaline storage batteries under the typical test conditions as described below: charge characteristic, discharge characteristic, cycle life characteristic and preservation characteristic.

To check the charge characteristic, the battery inner pressure during a rapid charge operation was examined as follows. After a complete discharge, each of the batteries was charged for 1.5 hours at 20° C. with a current of 1 CmA (1,200 mA). During the charging operation, changes in the battery inner pressure were measured with a pressure sensor. The maximum battery voltage $P_{max}$ of each battery is shown in Table 2 below.

To check the discharge characteristic, the low-temperature high-rate discharge performance was examined as follows. After a complete charge at room temperature, each battery was discharged at 0° C. with 1 CmA (1,200 mA) until the battery voltage dropped to 1.0 V. Table 2 shows the discharge capacity ratio C and the mean discharge voltage $V_i$ under the conditions where the standard discharge capacity at 20° C. and with a current of 240 mA is set at 100%.

To check the cycle life characteristic, number of cycles were counted under the following conditions. In order to clarify the negative electrode alloy characteristic, each battery was charged for 3 hours at 40° C. with a current of 600 mA and then discharged under the same temperature and current condition, until the battery voltage dropped to 1.0 V. This charge-discharge cycle was repeated until the discharge capacity decreased below 60% of the initial discharge capacity. Number of cycles of each battery is shown in Table 2.

To check the preservation characteristic, each of the batteries in discharged state was left in the atmosphere of 65° C. in order to observe a decrease in the open-circuit voltage, along with the preservation period. The days until the drop of the open-circuit voltage to 0.81 V are shown in Table 2.

TABLE 2

| No. | Co content (atom %) | Treatment | Internal pressure $P_{max}$ (kgf/cm²) | Discharge Characteristic C(%) | $V_i$ (V) | life (cycle) | High-Temp preservation (day) |
|---|---|---|---|---|---|---|---|
| 1 | 12.5 | none | 5.4 | 85 | 1.16 | 320 | 78 |
|   |      | treated | 5.1 | 87 | 1.19 | 330 | 105 |
| 2 | 9.2 | none | 7.7 | 82 | 1.14 | 285 | 75 |
|   |     | treated | 6.3 | 85 | 1.16 | 305 | 96 |
| 3 | 5.8 | none | 10.3 | 78 | 1.11 | 250 | 62 |
|   |     | treated | 6.8 | 84 | 1.15 | 290 | 84 |
| 4 | 2.5 | none | 12.3 | 75 | 1.09 | 180 | 47 |
|   |     | treated | 7.2 | 83 | 1.14 | 270 | 77 |
| 5 | 0.8 | none | 14.5 | 73 | 1.08 | 145 | 35 |
|   |     | treated | 7.8 | 82 | 1.13 | 265 | 68 |
| 6 | 0 | none | 15.8 | 70 | 1.03 | 90 | 29 |
|   |   | treated | 8.3 | 81 | 1.11 | 240 | 65 |

The results of these examinations indicate the following: as for the charge characteristic, although battery inner pressure increases with a decrease in cobalt content, the pressure increase can be restrained by applying the surface treatment. As a result of the surface treatment, the battery inner pressure was maintained at the target degree of 10 kgf/cm² or below, even in the alloy having a low cobalt content.

As to the low-temperature high-rate discharge characteristic, although the capacity ratio and the mean discharge voltage both decrease with a decrease in cobalt content, these decreases can be restrained by applying the surface treatment. As a result of the surface treatment, the capacity ratio and the mean discharge voltage achieved the target degrees of over 80% and 1.1 V, respectively, even in the alloy having a low cobalt content.

As for the cycle life characteristic, although number of cycles decreases with a decrease in cobalt content, the decrease in the cycle number is restrained by applying the surface treatment. As a result of the surface treatment, the cycle number reached the target number of 200 or higher even in the alloy having a low cobalt content.

The examination results of the discharge preservation test at 65° C. indicate that although a decrease in the open-circuit voltage is accelerated with decreasing cobalt content, which leads to a decrease in the preservation period, the preservation characteristic is improved by applying the surface treatment. As a result of the surface treatment, the target preservation period of 60 days was obtained even in the alloy having a low cobalt content.

In conclusion, the examination results of the main battery characteristics indicated that by application of the surface treatment in accordance with the present invention, it is possible to suppress a decrease in the cycle life and preservation characteristics of the alkaline storage batteries derived from a low cobalt content of a hydrogen storage alloy used in the battery, thereby realizing alkaline storage batteries with satisfactory performance for practical use.

Furthermore, the surface treatment improves the rapid charge and high-rate discharge characteristics which are significant for the alkaline storage batteries.

As discussed above, according to the present invention, it is possible to obtain a storage battery having satisfactory battery characteristics even if the hydrogen storage alloy having a low cobalt content is included in the batteries.

Then, the risk of possible ignition of the hydrogen storage alloy and the electrodes including the same, which becomes a serious problem during the manufacturing process, was examined.

The ignitability of the alloys and the electrodes was examined by a fire exposure test under the following conditions. Hydrogen storage alloy powders which had been dried to eliminate the influence of moisture and electrode plates were used as samples. Each of these samples was placed on an inorganic heat-insulating board and exposed directly to a diffusion flame of a gas lighter for 10 seconds. The ease of ignition was assessed based on the time required for ignition and the subsequent burning state of a sample.

First, the alloy compositions were examined. Examination of the 12 alloy powders (6 treated alloy powders and 6 untreated alloy powders) revealed that the non-treated alloy powders required 3 seconds for ignition, and therefore were evaluated as highly dangerous. On the other hand, of the 6 surface-treated alloy powders, 5 ignited within 3 to 10 seconds, and therefore were evaluated as moderately dangerous.

Then, the electrodes employing these 12 alloy powders respectively were evaluated in the same manner. None of these electrodes ignited within 10 seconds and their dangerousness was estimated as low. By putting the samples in contact with the diffusion flame for a longer time, it was found that the electrodes employing the surface-treated alloys have poor ignitability.

In conclusion, it has become obvious that the surface treatment of the present invention is effective to reduce the danger of ignition which has been the objective of hydrogen storage alloys.

EMBODIMENT 2

Six alloys No. 7–12 having the same compositions as the alloys No. 1–6 of the first embodiment, respectively, were prepared by the normal high-frequency melting-casting method and then powdered by the gas atomizing method as follows: Each of the alloys No. 7–12 was heated to melt and dropped through a nozzle having a diameter of 2 mm. The molten alloy was sprayed with argon gas at an injection pressure of about 60 kgf/cm² while dropping, and powdered. The cooling rate of the gas atomizing method is considered to be $10^4$ to $10^5$ K/sec which is much higher than that of the high-frequency melting-casting method applied in the first embodiment. The alloy powders thus obtained were approximately spherical. Powder particles having a diameter of 10 to 100 μm were selected, heat-treated for an hour at 900° C. in a vacuum, and used as samples.

Each of the hydrogen storage alloys No. 7–12 which were thus powdered was added together with cobalt hydroxide to a potassium hydroxide aqueous solution at a temperature of 120° C. having a specific gravity of 1.30 to provide the alloy powder with a surface treatment in the same manner as in the first embodiment.

As a result of the surface treatment, the color of all the alloy powders was changed from metallic into black, like as in the first embodiment. It was observed that the blackened surfaces of the alloy powders were covered with nickel- and cobalt-rich layers and the concentration of both nickel and cobalt gradually decreased in the direction of depth until it reached the degree in the original alloy compositions.

The six surface-treated alloy powders were used to produce hydrogen storage alloy electrodes, and then alkaline storage batteries were manufactured by employing these electrodes.

The battery characteristics of the batteries thus manufactured were examined under the same conditions as in the first embodiment.

The examination revealed that the powdering by the gas atomizing method enhanced the battery characteristics and the safety of the alloys although the same compositions and surface treatment conditions as those in the first embodiment were applied. The examination results of the battery characteristics are shown in Table 3.

TABLE 3

| | Co content | | Battery characteristics Internal pressure $P_{max}$ | Discharge Characteristic | | life (cycle) | preservation (day) |
|---|---|---|---|---|---|---|---|
| No. | (atom %) | Treatment | kgf/cm² | C(%) | Vi(V) | | |
| 7 | 12.5 | treated | 5.6 | 88 | 1.20 | 350 | 125 |
| 8 | 9.2 | treated | 6.9 | 86 | 1.77 | 335 | 107 |

TABLE 3-continued

| No. | Co content (atom %) | Treatment | Battery characteristics Internal pressure $P_{max}$ kgf/cm$^2$ | Discharge Characteristic C(%) | Vi(V) | life (cycle) | preservation (day) |
|---|---|---|---|---|---|---|---|
| 9 | 5.8 | treated | 7.3 | 85 | 1.16 | 330 | 98 |
| 10 | 2.5 | treated | 7.5 | 83 | 1.14 | 300 | 89 |
| 11 | 0.8 | treated | 8.1 | 83 | 1.14 | 285 | 82 |
| 12 | 0 | treated | 8.8 | 82 | 1.12 | 265 | 78 |

It is apparent from a comparison of the results shown in Table 3 and Table 2 that the batteries employing the allow powders that were prepared by the gas atomizing method have as good charge and discharge characteristics as those employing the alloy powders that were prepared by mechanical pulverization. As for the cycle life and high-temperature characteristics, the batteries with the alloy powders prepared by the gas atomizing method were much better than those with mechanically-pulverized alloy powders.

The ignitability test was conducted on the alloy powders made from the alloys No. 7–12 and the electrode plates employing these alloy powders in the same manner as in the first embodiment. As a result, it was observed that none of the alloy powders ignited within 10 seconds, and their danger was regarded as low. The same results were obtained from the electrode plates. It was also turned out that the alloys No. 7–12 of the present embodiment were all safer than the alloys No. 1–6 of the first embodiment.

The same test was conducted on the powders prepared by the roll quenching method and the centrifugal atomizing method both of which are categorized as the ultra-rapid quenching method like the gas atomizing method. As a result, these alloy powders had the same effects as those of alloys No. 7–12 obtained by the gas atomizing method. The surface treatment is also effective for an Mm-Ni type hydrogen alloy powder having a crystal structure of CaCu$_5$, particularly for the alloy containing cobalt at 15 atom % or less, prepared by the ultra-rapid quenching method at a cooling rate of 10$^3$ K/sec or higher.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A method of producing a hydrogen storage alloy for a battery comprising the steps of:
   powdering an Mm-Ni system hydrogen storage alloy having a crystal structure of CaCU$_5$ and containing 15 atom % or less of cobalt to have an average particle diameter of 10–100 µm;
   immersing the resultant powdered alloy in a treatment solution at 80°–130° C., said treatment solution comprising an alkaline aqueous solution containing 10 g/l or more of lithium hydroxide and having a specific gravity of 1.1 or higher, and cobalt ions which are contained in said alkaline aqueous solution, thereby forming a layer containing nickel and cobalt onto a surface of said powdered alloy, wherein a concentration of said nickel on said surface is higher than a concentration of said nickel in a remainder of said powdered alloy, and wherein a concentration of said cobalt on said surface is higher than a concentration of cobalt in a remainder of said powdered alloy; and
   washing said powdered alloy having said layer with water and drying the powdered alloy.

2. The method of producing a hydrogen storage alloy for a battery in accordance with claim 1, wherein the powdering step is carried out at a cooling rate of 10$^3$ K/sec or higher by quenching method selected from the group consisting of gas atomizing method, roll quenching method and centrifugal atomizing method.

3. The method of producing a hydrogen storage alloy for a battery in accordance with claim 1, wherein the hydrogen storage alloy contains cobalt by 0.1–6 atom %.

4. The method of producing a hydrogen storage alloy for a battery in accordance with claim 1, wherein the alkaline aqueous solution contains 0.5–5 parts by weight of cobalt to 100 parts by weight of the hydrogen storage alloy.

5. A method of producing a hydrogen storage alloy for a battery comprising the steps of:
   powdering an Mm-Ni system hydrogen storage alloy having a crystal structure of CaCu$_5$ and containing 15 atom % or less of cobalt to have an average particle diameter of 10 to 100 µm by gas atomizing method comprising melting said hydrogen storage alloy, dropping the molten hydrogen storage alloy and spraying the dropping hydrogen storage alloy with a gas;
   immersing the resultant powdered alloy in a treatment solution at 80°–130° C., said treatment solution comprising an alkaline aqueous solution containing 10 g/l or more of lithium hydroxide and having a specific gravity of 1.1 or higher, and cobalt ions which are contained in said alkaline aqueous solution, thereby forming a layer containing nickel and cobalt onto a surface of said powdered alloy, wherein a concentration of said nickel on said surface is higher than a concentration of said nickel in a remainder of said powdered alloy, and wherein a concentration of said cobalt on said surface is higher than a concentration of cobalt in a remainder of said powdered alloy; and
   washing said powdered alloy having said layer with water and drying said powdered alloy.

* * * * *